(12) United States Patent
Agardh et al.

(10) Patent No.: US 11,510,247 B2
(45) Date of Patent: Nov. 22, 2022

(54) EFFICIENT CHANNEL ACCESS

(71) Applicant: Sony Mobile Communications Inc., Tokyo (JP)

(72) Inventors: Kåre Agardh, Rydebäck (SE); Rickard Ljung, Helsingborg (SE)

(73) Assignee: SONY GROUP CORPORATION, Tokyo (JP)

( * ) Notice: Subject to any disclaimer, the term of this patent is extended or adjusted under 35 U.S.C. 154(b) by 31 days.

(21) Appl. No.: 15/780,050

(22) PCT Filed: Nov. 30, 2015

(86) PCT No.: PCT/EP2015/078068
§ 371 (c)(1),
(2) Date: May 30, 2018

(87) PCT Pub. No.: WO2017/092784
PCT Pub. Date: Jun. 8, 2017

(65) Prior Publication Data
US 2018/0352579 A1 Dec. 6, 2018

(51) Int. Cl.
*H04L 1/00* (2006.01)
*H04W 74/08* (2009.01)
(Continued)

(52) U.S. Cl.
CPC ....... *H04W 74/0825* (2013.01); *H04L 1/0001* (2013.01); *H04L 25/0206* (2013.01);
(Continued)

(58) Field of Classification Search
None
See application file for complete search history.

(56) References Cited

U.S. PATENT DOCUMENTS

| 2007/0286122 A1 | 12/2007 | Fonseca |
| 2008/0144500 A1* | 6/2008 | Chen ............... H04L 43/16 370/235 |

(Continued)

FOREIGN PATENT DOCUMENTS

| EP | 2775776 A1 | 9/2014 |
| WO | 2016072917 A2 | 5/2016 |
| WO | 2017058135 A1 | 4/2017 |

OTHER PUBLICATIONS

International Search Report and Written Opinion; dated Aug. 10, 2016; issued in International Patent Application No. PCT/EP2015/078068.

(Continued)

*Primary Examiner* — Scott M Sciacca
(74) *Attorney, Agent, or Firm* — Tucker Ellis LLP

(57) ABSTRACT

Embodiments provide efficient channel access utilizing a channel assessment mode and include determining that a predetermined condition exists on a radio bandwidth (e.g., unlicensed band); and, in response to determining that the predetermined condition exists on the radio bandwidth, initiating the channel assessment mode on the mobile device, where the channel assessment mode is configured to implement a channel assessment scheme configured for efficiently accessing a channel on the radio bandwidth. Some embodiments monitor the radio bandwidth for one or more triggering events indicative of interference; and detect at least one of the one or more triggering events indicative of interference on the radio bandwidth in order to determine the predetermined condition exists. These triggering events may include determining a current/historic packet collision probability is above a threshold, detecting signals that identify (Continued)

another radio access system, detecting a channel utilization ratio above a threshold, and determining a current/historic data throughput.

26 Claims, 7 Drawing Sheets

(51) Int. Cl.
| | |
|---|---|
| *H04W 72/12* | (2009.01) |
| *H04W 16/14* | (2009.01) |
| *H04L 25/02* | (2006.01) |
| *H04W 24/10* | (2009.01) |
| *H04W 72/10* | (2009.01) |

(52) U.S. Cl.
CPC ........... *H04W 16/14* (2013.01); *H04W 24/10* (2013.01); *H04W 72/1242* (2013.01); *H04W 74/0808* (2013.01); *H04W 72/10* (2013.01)

(56) References Cited

U.S. PATENT DOCUMENTS

| | | | | |
|---|---|---|---|---|
| 2011/0019721 A1* | 1/2011 | Diener | ................. | H04W 88/02 |
| | | | | 375/219 |
| 2012/0163279 A1* | 6/2012 | Tran | ........................ | H04Q 9/00 |
| | | | | 370/312 |
| 2013/0017794 A1 | 1/2013 | Kloper et al. | | |
| 2015/0085685 A1 | 3/2015 | Majjigi et al. | | |
| 2015/0208253 A1 | 7/2015 | Kim et al. | | |
| 2015/0271729 A1* | 9/2015 | Sirotkin | ................ | H04W 36/30 |
| | | | | 370/332 |
| 2016/0295488 A1* | 10/2016 | Maaref | ................. | H04W 74/08 |
| 2017/0164405 A1* | 6/2017 | Kneckt | ................. | H04W 92/18 |
| 2018/0317246 A1* | 11/2018 | Mukherjee | ........ | H04W 72/1236 |
| 2019/0052445 A1* | 2/2019 | Rantala | ................. | H04L 5/0037 |
| 2021/0036808 A1* | 2/2021 | Papasakellariou | .... | H04L 5/0053 |

OTHER PUBLICATIONS

Office Action for corresponding European Application No. 15801857.2, dated May 6, 2021. 6 pages.
Chinese Search Report dated Dec. 24, 2021 for Application Serial No. 201580084936 (1 page).
European Office Action dated Jan. 28, 2022 for Application Serial No. 15801857.2 (8 pages).
Chinese Office Action dated May 22, 2020 for Application Serial No. 201580084936 (8 pages).
Chinese Office Action dated Jan. 8, 2021 for Application Serial No. 201580084936 (6 pages).
Chinese Office Action dated Apr. 14, 2021 for Application Serial No. 201580084936 (5 pages).
International Preliminary Report on Patentability dated Jun. 5, 2018 for Application Serial No. PCT/EP2015/078068 (8 pages).
Chinese Search Report dated May 18, 2020 for Application Serial No. 2015800849936 (2 pages).

* cited by examiner

EFFICIENT CHANNEL ACCESS

FIELD OF THE INVENTION

In general, embodiments of the invention relate to mobile communication network communications and, more particularly, to utilizing unlicensed, free radio spectrum for cellular operator-owned communications.

BACKGROUND

Recently, cellular technologies such as 4G/LTE are starting to use unlicensed, free radio spectrum for cellular operator-owned communications. A primary example of such unlicensed spectrum is the so-called "5 GHz band". The 5 GHz band is one of the frequency bands where wireless fidelity (Wi-Fi or WI-FI) is currently deployed. In various jurisdictions in the world, such unlicensed bands may be used with very little or no regulation and/or restriction. For example, depending on regional requirements it may or may not be mandatory for devices to utilize a listen-before-talk (LBT) algorithm for channel assessment. In other words, a wireless device operating in the unlicensed band may, at any time, send data without considering whether its transmission will conflict with ongoing traffic between other devices. Also other frequency bands can allow for two or more radio access technologies to co-exist in an unlicensed or shared manner. These frequency bands allow that multiple radio access technologies can be at any radio band, both for low frequency ranges in hundreds of MHz and high frequency ranges up to hundreds of GHz.

The 802.11 wireless local area network (WLAN) standard uses carrier sense multiple access (CSMA) protocol, which requires that devices listen before starting to transmit. If traffic on the network is heavy and not all co-existing technologies use similar channel access protocols, use of such LBT protocols may significantly limit the probabilities for a device to successfully transmit packets on the frequency band.

Therefore, a need exists to develop apparatus, systems, methods and the like that will provide a more aggressive channel access protocol for unlicensed radio bands such as those currently utilized by Wi-Fi.

BRIEF SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like for efficient channel access utilizing a channel assessment mode and include determining, by a stationary access point and/or mobile device, that a predetermined condition exists on a radio bandwidth; and, in response to determining that the predetermined condition exists on the radio bandwidth, initiating, by the stationary access point and/or mobile device, the channel assessment mode on the stationary access point and/or mobile device, where the channel assessment mode is configured to implement a channel assessment scheme configured for efficiently accessing a channel on the radio bandwidth. Some embodiments monitor the radio bandwidth for one or more triggering events indicative of interference; and detect at least one of the one or more triggering events indicative of interference on the radio bandwidth in order to determine the predetermined condition exists. These triggering events may include (i) determining a current/historic packet collision probability is above a threshold, (ii) detecting signals that identify another radio access system, (iii) detecting a channel utilization ratio above a threshold, and/or (iv) determining a current/historic data throughput.

In order to determine that the predetermined condition exists, other embodiments do one or more of (i) determine that data to be transmitted is of a high quality of service (QoS) priority class, (ii) monitor whether and, if any, how many previous retransmissions have failed, resulting in a failed retransmissions number and determine that the failed retransmissions number exceeds a predetermined threshold, (iii) determine that a buffer overflow is critical, and (iv) determine that one or more high priority link packets are to be transmitted.

When a stationary or mobile device is operating in the channel assessment mode, different embodiments:
(i) monitor the channel, receive a data packet header with information indicative of the data packet end, estimate an end of a data packet being transmitted over the channel, determine a random number and compare it to a probability threshold, and if the determined random number is greater than (or lower than) the probability threshold, initiate transmission at the estimated end of the data packet; or
(ii) determine a predetermined packet length by monitoring the channel, receiving a data packet header comprising information indicative of a data packet type corresponding to the data packet being transmitted over the channel, and retrieving the predetermined packet length corresponding to the data packet type. Then, based on the predetermined packet length, these embodiments determine an end of a data packet being transmitted over the channel, determine a random number and compare it to a probability threshold, and if the determined random number is greater than (or lower than) the probability threshold, initiate transmission at the estimated end of the data packet.

Thus, systems, apparatus, methods, and computer program products described in detail below provide efficient channel access utilizing a channel assessment mode.

According to embodiments of the invention, a method includes determining, by a stationary or mobile device, that a predetermined condition exists on a radio bandwidth; and in response to determining that the predetermined condition exists on the radio bandwidth, initiating, by the device, the channel assessment mode on the stationary access point and/or mobile device, wherein the channel assessment mode is configured to implement a channel assessment scheme configured for efficiently accessing a channel on the radio bandwidth.

In some embodiments, determining that a predetermined condition exists comprises monitoring the radio bandwidth for one or more triggering events indicative of interference; and detecting at least one of the one or more triggering events indicative of interference on the radio bandwidth. In some such embodiments, monitoring the radio bandwidth comprises determining a probability of transmission packet collision threshold; and detecting at least one of the one or more triggering events comprises determining that a current or historical probability of transmission packet collision exceeds the probability of transmission packet collision threshold. In some of these embodiments, determining comprises receiving information, from the mobile device, an access point or base station, indicative of the current or historical probability of transmission packet collision. In some of these embodiments, receiving is in response to requesting, by the mobile device from the access point or by the access point from the mobile device, information indicative of the current or historical probability of transmission packet collision.

In some embodiments, monitoring the radio bandwidth comprises monitoring the radio bandwidth for one or more radio channel measurement criteria. In some of these embodiments, the device is configured for accessing a first radio access system over the radio bandwidth; where monitoring the radio bandwidth for one or more radio channel measurement criteria comprises monitoring the radio bandwidth to identify one or more signals corresponding to a second radio access system different than the first radio access system; and where detecting at least one of the one or more triggering events comprises determining that the identified one or more signals correspond to the second radio access system different than the first radio access system.

In other such embodiments, monitoring the radio bandwidth for one or more radio channel measurement criteria comprises determining a channel utilization ratio threshold; and detecting at least one of the one or more triggering events comprises determining that a current channel utilization ratio exceeds the channel utilization ratio threshold. In some of these embodiments, determining the current channel utilization ratio exceeds the channel utilization ratio threshold comprises receiving information, from an access point, indicative of the current channel utilization ratio. In some of these embodiments, determining the current channel utilization ratio exceeds the channel utilization ratio threshold comprises determining a channel noise level; determining a channel total level; and determining the current channel utilization ratio by dividing the channel noise level by the channel total level.

In some embodiments, monitoring the radio bandwidth comprises monitoring data throughput on the radio bandwidth and determining a data throughput threshold; and detecting at least one of the one or more triggering events comprises determining that a current or historical data throughput falls below the data throughput threshold.

In some embodiments, determining that a predetermined condition exists comprises determining that data to be transmitted is of a high quality of service (QoS) priority class.

In some embodiments, determining that a predetermined condition exists comprises monitoring whether and, if any, how many previous retransmissions have failed, resulting in a failed retransmissions number; and determining that the failed retransmissions number exceeds a predetermined threshold. In some such embodiments, determining that a predetermined condition exists further comprises determining that a buffer overflow is critical.

In some embodiments, determining that a predetermined condition exists comprises determining that one or more high priority link packets, e.g. control signaling packets, are to be transmitted.

In some embodiments, implementing the channel assessment scheme comprises estimating an end of a data packet being transmitted over the channel; determine a random number and compare it to a probability threshold, and if the determined random number is greater than (or lower than) the probability threshold, initiate transmission at the estimated end of the data packet; In some such embodiments, the method includes monitoring the channel; and receiving a data packet header comprising information indicative of the data packet end, wherein estimating the end of the data packet is based at least in part on the information indicative of the data packet end.

In some embodiments, implementing the channel assessment scheme comprises determining a p-persistent access probability threshold or range indicative of whether to initiate a transmission immediately at the estimated end of the data packet; and if the determined random number is above/below or within the probability threshold or range, respectively, initiate transmission at the estimated end of the data packet.

In some embodiments, implementing the channel assessment scheme comprises determining a predetermined packet length; based on the predetermined packet length, determine an end of a data packet being transmitted over the channel; determine a random number and compare it to a probability threshold, and if the determined random number is greater than (or lower than) the probability threshold, initiate transmission at the estimated end of the data packet. In some such embodiments, determining a predetermined packet length comprises monitoring the channel; receiving a data packet header comprising information indicative of a data packet type corresponding to the data packet being transmitted over the channel; and retrieving the predetermined packet length corresponding to the data packet type.

According to embodiments of the invention a mobile communication system includes an access point (AP); and a user equipment (UE) configured to operatively couple to the AP over a channel on a radio bandwidth, the user equipment and/or the AP being configured to determine that a predetermined condition exists on the radio bandwidth; and in response to determining that the predetermined condition exists on the radio bandwidth, initiate the channel assessment mode, wherein the channel assessment mode is configured to implement a channel assessment scheme configured for efficiently accessing the channel on the radio bandwidth.

According to embodiments of the invention, a mobile communication device includes a processor; and a memory operatively coupled with the processor, the memory storing instructions executable by the processor to cause the processor to determine that a predetermined condition exists on a radio bandwidth; and in response to determining that the predetermined condition exists on the radio bandwidth, initiate the channel assessment mode on the mobile communication device, wherein the channel assessment mode is configured to implement a channel assessment scheme configured for efficiently accessing the channel on the radio bandwidth.

BRIEF DESCRIPTION OF THE DRAWINGS

Figure 1:
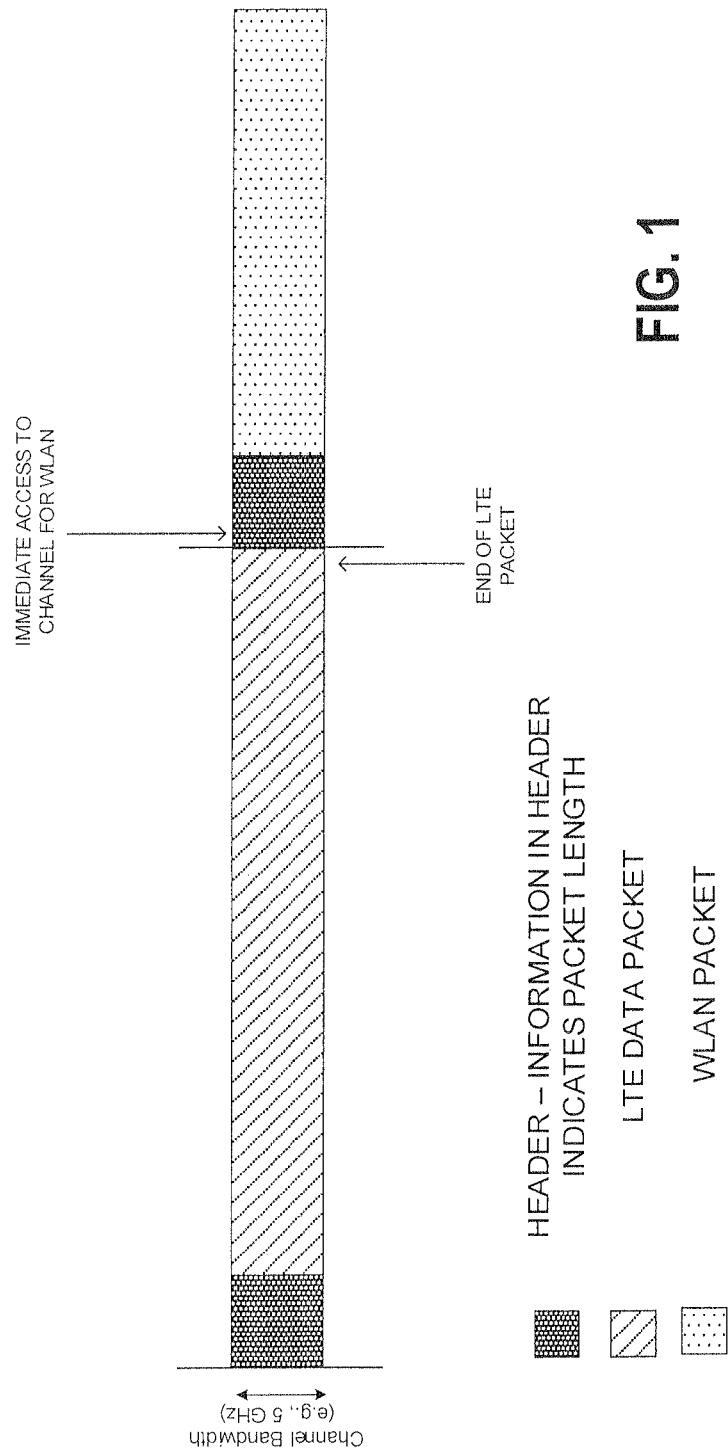
Figure 2:
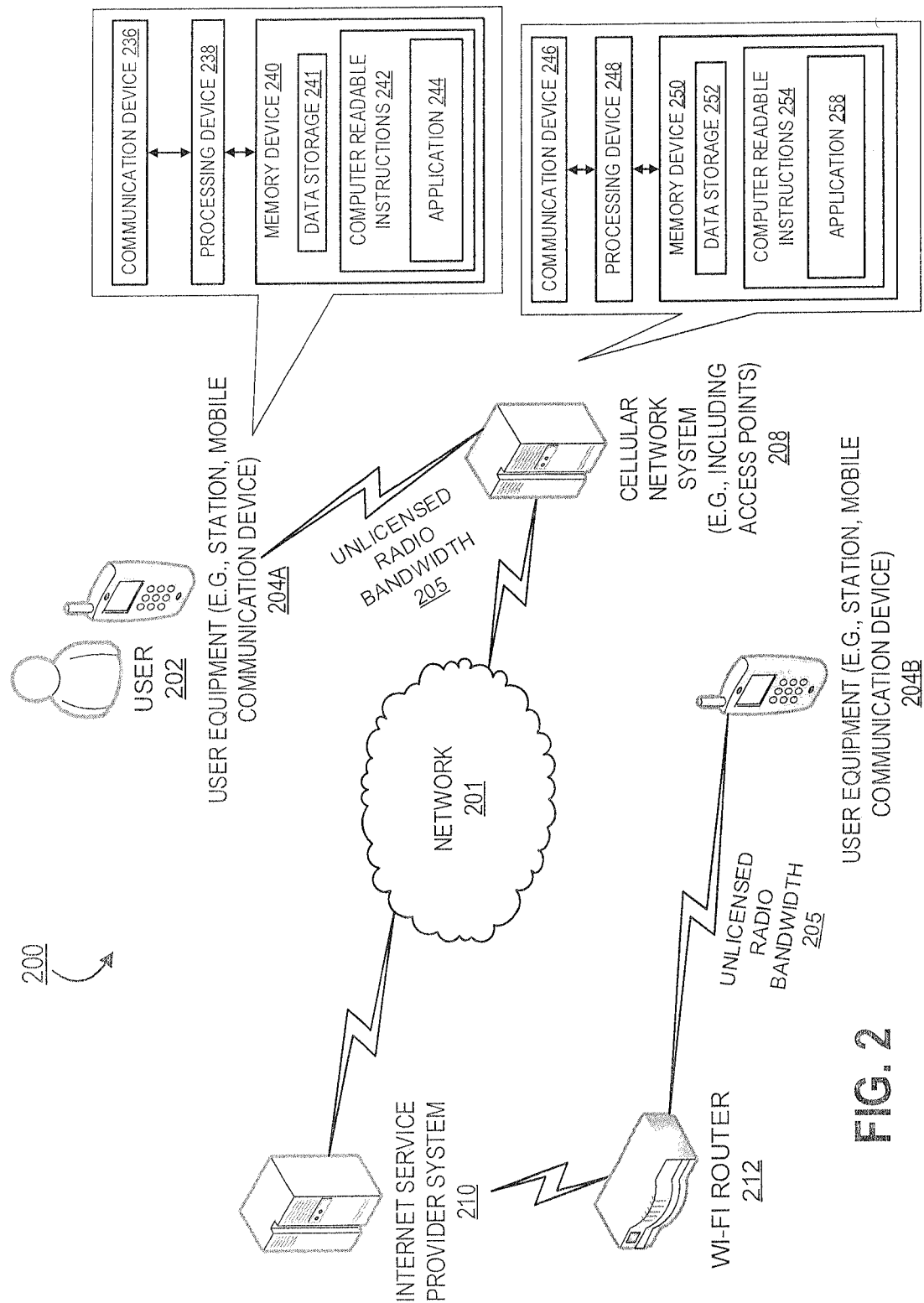
Figure 3:
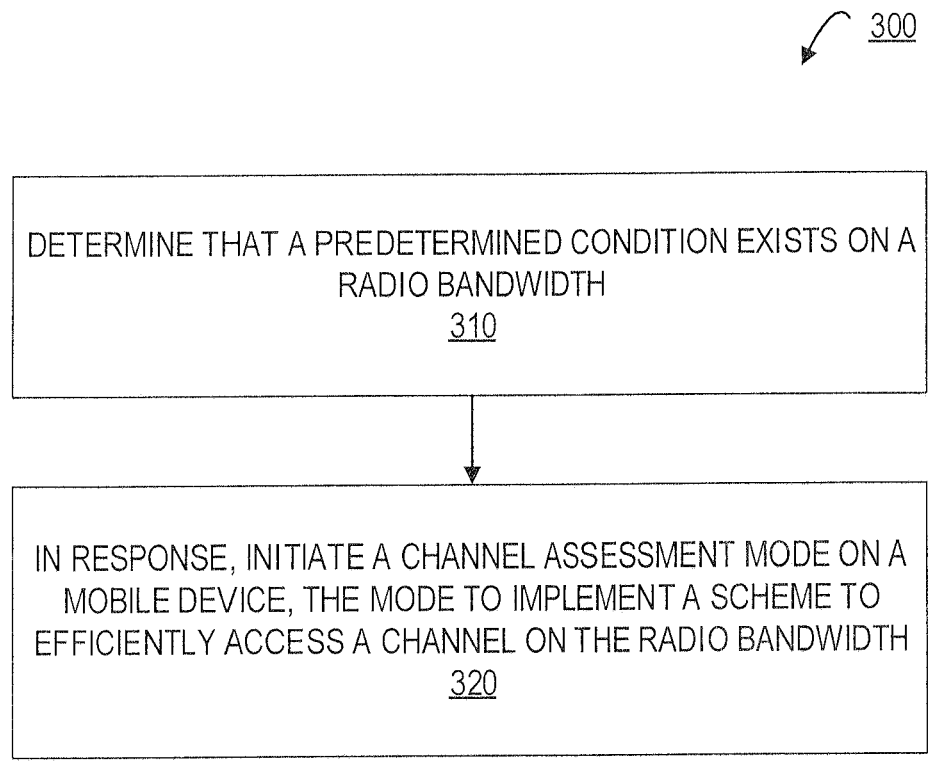
Figure 4A:
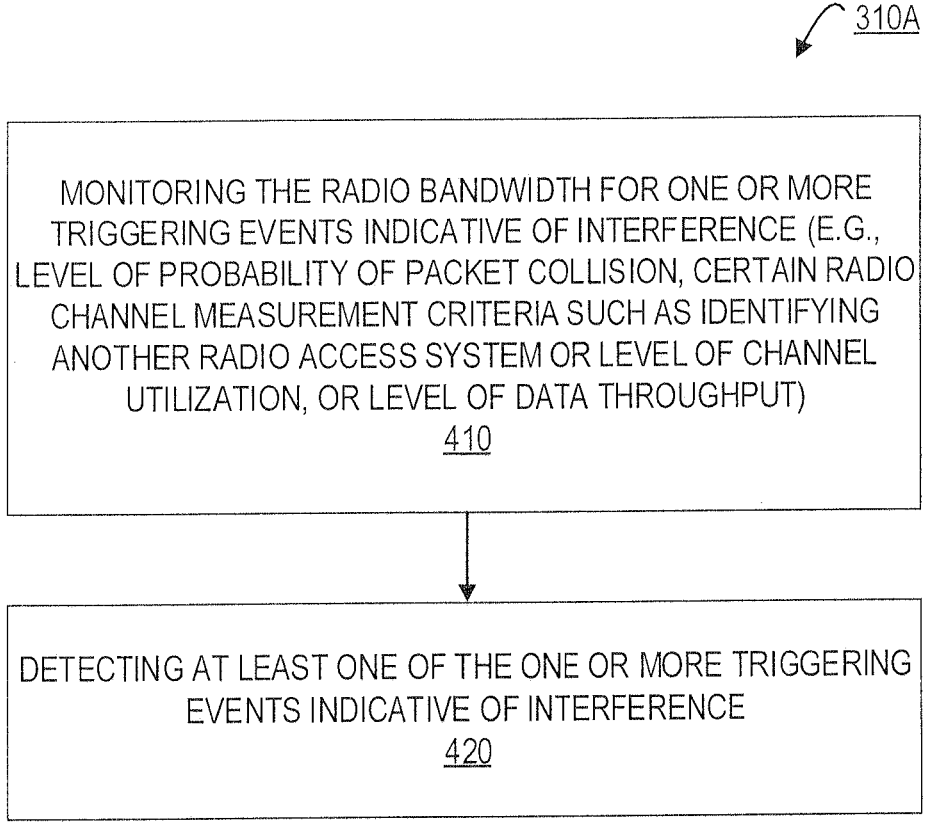
Figure 4B:
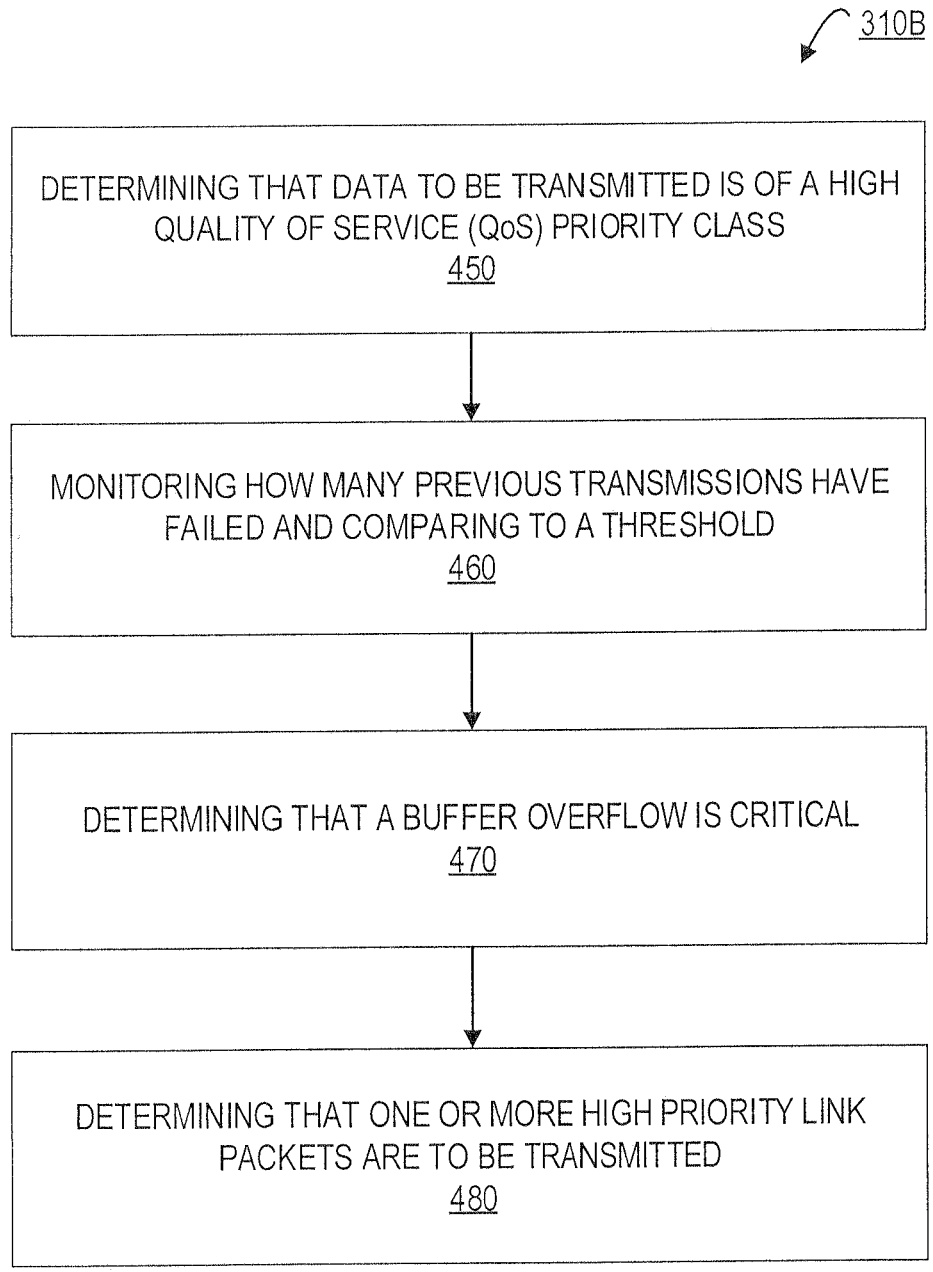
Figure 5A:
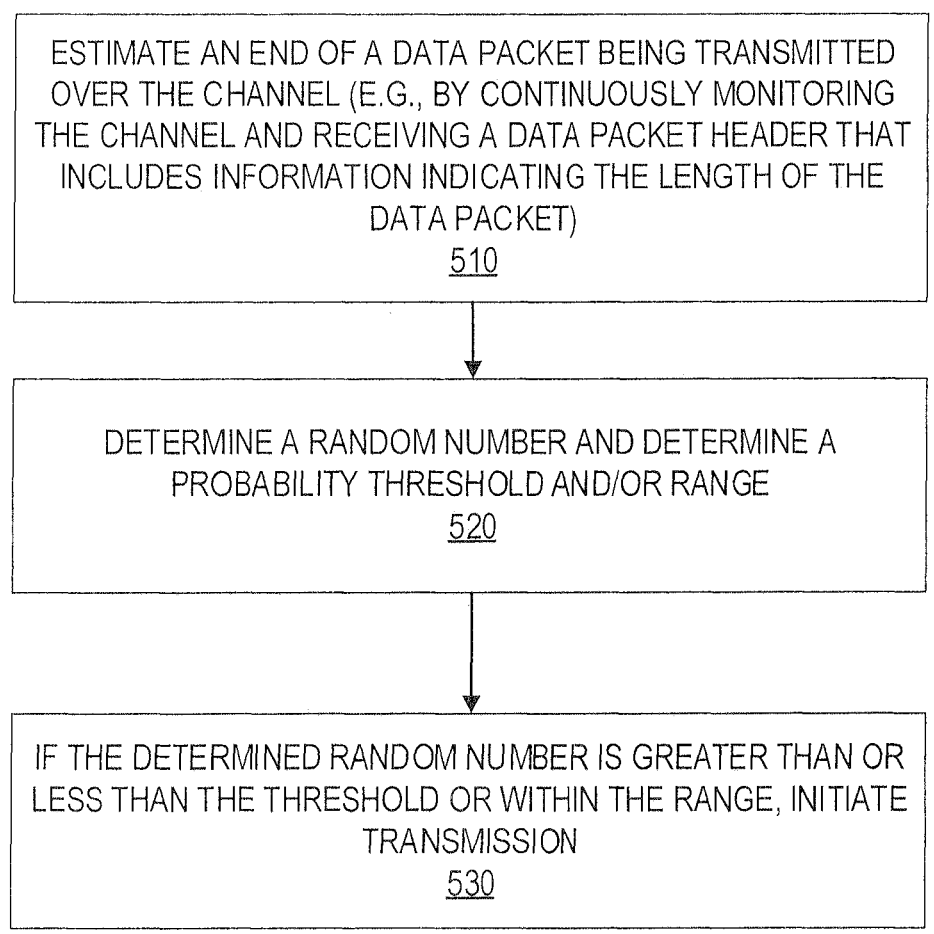
Figure 5B:
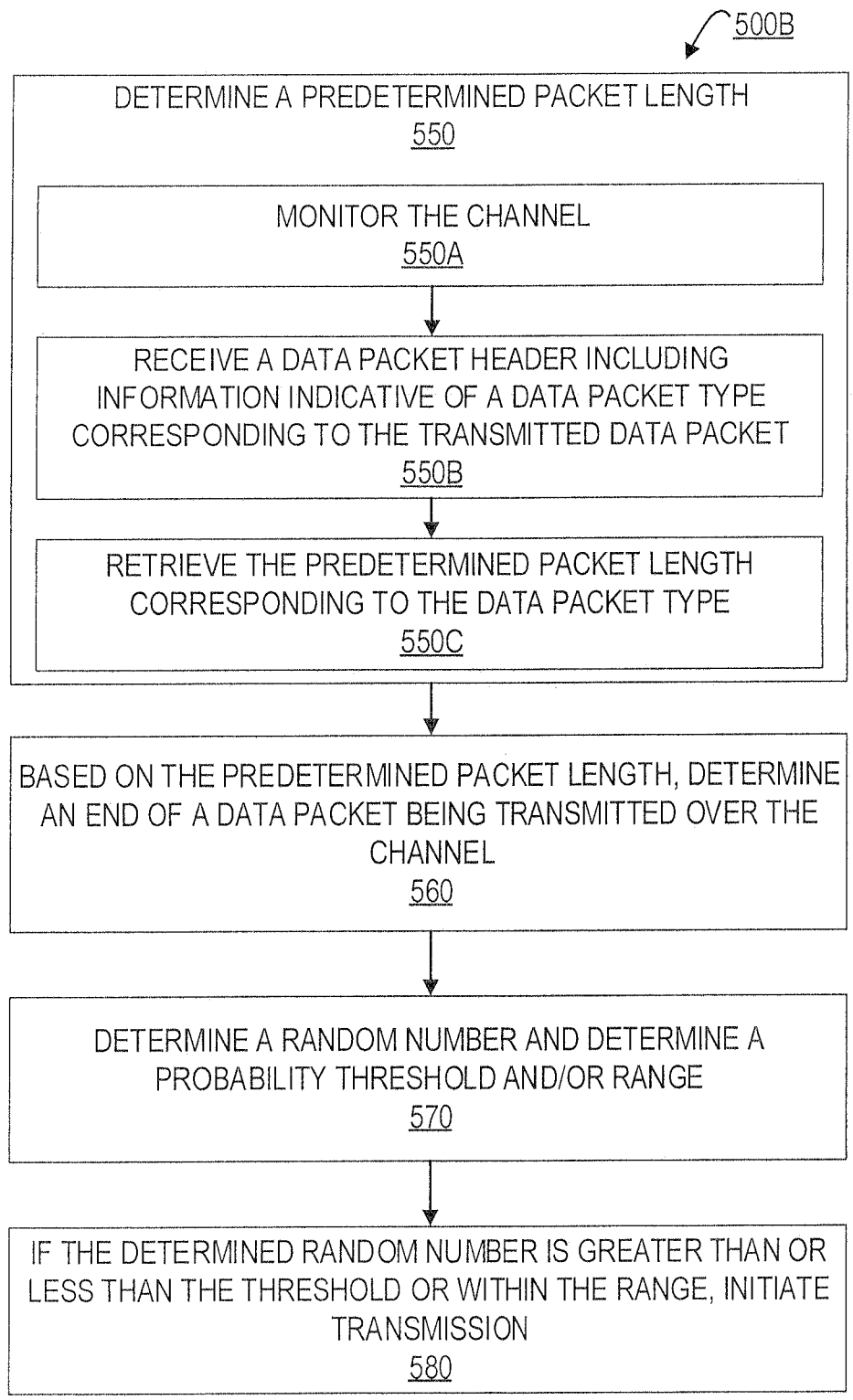

Having thus described embodiments of the invention in general terms, reference will now be made to the accompanying drawings, where:

FIG. 1 is a diagram of a channel transmission illustrating implementation of a channel assessment mode according to embodiments of the invention;

FIG. 2 is a diagram of a User Equipment (UE), operating in an environment according to embodiments of the invention;

FIG. 3 is a flowchart illustrating a method for efficient channel access according to embodiments of the invention;

FIG. 4A is a flowchart illustrating a method for determining that a predetermined condition exists according to embodiments of the invention;

FIG. 4B is a flowchart illustrating a method for determining that a predetermined condition exists according to embodiments of the invention;

FIG. 5A is a flowchart illustrating a method for initiating transmission at an estimated end of a data packet according to embodiments of the invention; and FIG. 5B is a flowchart illustrating a method for initiating transmission at a determined end of a data packet according to embodiments of the invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

A "node" or "device" may be or include a station, user equipment ("UE"), a mobile device, a mobile communication device and/or the like. For the purpose of sending or receiving data, the device may connect to a wireless local area network ("WLAN") or a mobile communication network such as a radio access system (including evolution of 3GPP LTE releases, 3GPP LAA releases, and $5^{th}$ Generation ("5G") LTE releases). Any network described herein may have one or more base stations ("BS") and/or access points ("AP").

Various embodiments of the invention provide for immediate channel access on an unlicensed radio bandwidth such as the 5 GHz band used by Wi-Fi by using data packet length estimates or predetermined packet lengths and probabilities of channel utilization. One purpose of some embodiments of the invention is to, by pre-configuration or adaptively, utilize a certain operation mode that implements an aggressive channel assessment scheme in scenarios where required to communicate on a channel in an unregulated bandwidth. The dynamic activation of the mode can be based on one or more activation triggers as discussed in greater detail below, and the triggers may or may not be implementation dependent.

Once the channel assessment mode is activated, embodiments of the invention enable a device requesting to transmit data on a channel where traffic is ongoing determines a length of a data packet on the channel and initiates its desired transmission at the end of the data packet. In some embodiments, the device determines (prior to the end of the packet) a probability threshold or range and initiates its transmission based on a comparison of a randomly generated number and the probability threshold or range.

In some embodiments, implementing the channel assessment scheme comprises determining a p-persistent access probability threshold or range indicative of whether to initiate a transmission immediately at the estimated end of the data packet, and if the determined random number is above/below or within the probability threshold or range, respectively, the device initiates transmission at the estimated end of the data packet. The threshold and/or range may be determined as a parameter or parameters that control the probability that the device will initiate transmission at the estimated end of the data packet. The threshold may be pre-determined or dynamically selected, e.g., based on the information and/or data used to determine the triggering, i.e., initiation, of the channel assessment mode.

For example, if a node determines that the channel has a high historical collision rate or probability, then the node may dynamically adjust the probability threshold in order to provide a greater probability that the to-be transmitting device will have a successful transmission. Thus, if the probability threshold had been set at greater than 80%, then it may be adjusted down to greater than 60%, so that, for a particular random number generation, the likelihood of initiating transmission is higher.

If the probability threshold for transmission is selected to be medium to high (e.g., 50-90%), channel efficiency will be increased without giving up fairness to other devices. As discussed above, in general such channel access, that is, where the transmission at a determined time is decided based on a random number drawn and compared with a probability threshold or range (denoted as "p") is known as "p-persistent access". As another example, if the probability threshold is selected to be greater than 50%, then any random number generated that is greater than 50% will initiate transmission. Conversely, in another example, if the probability threshold is selected to be less than 50%, then any random number generated that is less than 50% will initiate transmission.

More particularly, embodiments of the invention provide for efficient channel access utilizing a channel assessment mode and include determining, by the to-be transmitting device, that a predetermined condition exists on a radio bandwidth; and, in response to determining that the predetermined condition exists on the radio bandwidth, initiating, by the mobile device, the channel assessment mode on the mobile device, where the channel assessment mode is configured to implement a channel assessment scheme configured for efficiently accessing a channel on the radio bandwidth, and the probability level of channel access initiation may be determined as a dynamic parameter based on the radio conditions.

Some embodiments monitor the radio bandwidth for one or more triggering events indicative of interference; and detect at least one of the one or more triggering events indicative of interference on the radio bandwidth in order to determine the predetermined condition exists. These triggering events may include (i) determining a current/historic packet collision probability is above a threshold, (ii) detecting signals that identify another radio access system, (iii) detecting a channel utilization ratio above a threshold, and/or (iv) determining a current/historic data throughput.

In order to determine that the predetermined condition exists, other embodiments do one or more of (i) determine that data to be transmitted is of a high quality of service (QoS) priority class, (ii) monitor whether and, if any, how many previous retransmissions have failed, resulting in a failed retransmissions number and determine that the failed retransmissions number exceeds a predetermined threshold, (iii) determine that a buffer overflow is critical, and/or (iv) determine that one or more high priority link packets, e.g. control signaling packets, are to be transmitted.

When the mobile device is operating in the channel assessment mode, different embodiments:
  (i) monitor the channel, receive a data packet header with information indicative of the data packet end, estimate an end of a data packet being transmitted over the channel, determine a random number and compare it to a probability threshold, and if the determined random number is greater than (or lower than) the probability threshold, initiate transmission at the estimated end of the data packet; or (ii) determine a predetermined packet length by continuously monitoring the channel, receiving a data packet header comprising information indicative of a data packet type corresponding to the data packet being transmitted over the channel, and retrieving the predetermined packet length corresponding to the data packet type. Then, based on the predetermined packet length, these embodiments determine an end of a data packet being transmitted over the channel, determine a random number and compare it to a probability threshold, and if the determined random number is greater than (or lower than) the probability threshold, initiate transmission at the estimated end of the data packet.

Referring now to FIG. 1, a diagram of a channel transmission illustrates implementation of a channel assessment mode according to embodiments of the invention. This diagram shows that, a data packet being transmitted on a channel includes a header that includes information indicative of the data packet's length. This information may be either information directly indicating the length or may be information indicating a type of data packet. The type of data packet, once determined, may be looked-up in data tables to determine the corresponding data packet length. Once the length is known, the node may determine when in the transmission cycle the end of the data packet will occur, determine a probability that another transmission will begin at that time (e.g., using p-persistent access), and, if the probability is lower than a desired threshold, immediately initiate transmission on the channel.

As shown in FIG. 2, a diagram illustrates a User Equipment (UE) (which may be any type of node such as a station, mobile device, access point, or the like that is configured to access a radio access system such as a cellular network system), operating in an environment according to embodiments of the invention.

The cellular network system 208 may be or include one or more base stations and/or access points and, in some embodiments, generally includes a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201. As such, the communication device 246 generally includes a modem, server, or other device for communicating with other devices on the network 201, which may include, for example, transmitting reference signals to LTE devices.

As further illustrated in FIG. 2, the cellular network system 208 includes computer-readable instructions 254 stored in the memory device 250, which in one embodiment includes the computer-readable instructions 254 of an application 258. In some embodiments, the memory device 250 includes data storage 252 for storing data related to and/or used by the application 258.

As illustrated in FIG. 2, the user equipment 204A (e.g., a station, mobile device, etc.) generally includes a communication device 236, a processing device 238, and a memory device 240. The processing device 238 is operatively coupled to the communication device 236 and the memory device 240. In some embodiments, the processing device 238 may send or receive data from the user equipment 204, and/or the network system 208 via the communication device 236 over a network 201. As such, the communication device 236 generally includes a modem, server, or other device for communicating with other devices on the network 201.

As further illustrated in FIG. 2, the user equipment 204A includes computer-readable instructions 242 stored in the memory device 240, which in one embodiment includes the computer-readable instructions 242 of an application 244. In the embodiment illustrated in FIG. 2, the application 244 allows the user equipment 206A to be linked to the cellular network system 208 to communicate, via a network 201. The application 244 may also allow the user equipment 206A to connect directly (i.e., locally or device to device) with the user equipment 206B. User equipment 206B (e.g., a station, mobile device, or the like) may include one or more components similar to those described with reference to user equipment 206A.

FIG. 2 illustrates the UE 204A accessing the cellular network system 208 using an unlicensed radio bandwidth 205. Similarly, UE 204B accesses WI-FI router 212 over the unlicensed radio bandwidth 205, which enables access to network 201 through internet service provider system 210. Accordingly, both UEs 204A and 204B are utilizing the same unlicensed radio bandwidth. Assuming the UEs are collocated or located in a relatively close geographic proximity, there is an opportunity for data transmission collision. Embodiments of the present invention assist in minimizing such collisions and generally increasing overall communication efficiencies on the channel, especially when many devices are attempting to transmit on the same channel.

The servers, systems, and/or devices described herein illustrate one embodiment of the invention. It is further understood that one or more of the servers, systems, and devices can be combined in other embodiments and still function in the same or similar way as the embodiments described herein.

Referring now to FIG. 3, a flowchart illustrates a method 300 for efficient channel access according to embodiments of the invention. The first step, represented by block 310, is for a node to determine that a predetermined condition exists on a radio bandwidth. The predetermined condition may be one or more triggers, conditions or the like. The radio bandwidth may be an unlicensed bandwidth such as the 5 GHz band. The next step, as represented by block 320, is for a node to, in response to determining that the predetermined condition exists on the radio bandwidth, initiate a channel assessment mode. The mode implements a scheme to efficiently access a channel on the radio bandwidth.

Referring now to FIG. 4A, a flowchart illustrates a method 310A for determining that a predetermined condition exists according to embodiments of the invention, which was first discussed above with reference to FIG. 3, step 310. In this regard, the steps of method 310A may be considered optional sub-steps of step 310. First, as represented by block 410, is for a node to monitor the radio bandwidth. This monitoring may be periodic, random, continuously or otherwise. The node monitors the bandwidth for triggering events indicative of interference. For example, in some cases, a level of probability of packet collision is determined based on monitoring the channel for packet collisions. In some of these embodiments, this includes collecting information indicative of current or historical statistics of transmission packet collision from the device's own packet transfer statistics.

In another example, certain radio channel measurement criteria are monitored such as (i) identifying another radio access system, (ii) determining a level of channel utilization, or (iii) determining a level of data throughput.

Regarding determining a level of channel utilization, in some embodiments the node may determine the total received energy level over a channel bandwidth and measure the amount of time the received energy detection level is above a determined threshold. This may, alternatively, involve taking multiple measurements over time and comparing each of the measurements to the threshold. The energy detection threshold may be selected as the same threshold as used during ordinary listen before talk procedure, or using a delta value that is a delta different from this LBT energy detection value. The delta may be pre-determined in system specifications, or if the device is a mobile device it may be specified by the access point. As noted above, in some embodiments, determining a channel total detected energy level may be accomplished over time by repeated measurements. In such cases, determining the current channel utilization ratio may be done by dividing the number of measurement occasions that the measurement exceeds the threshold by the total number of measurements.

Second, as represented by block 420, a node detects at least one of the one or more triggering events indicative of interference. As discussed above, once these optional sub-steps are performed, in some embodiments, the node then initiates the channel assessment mode (see step 320 of FIG. 3).

Referring now to FIG. 4B, a flowchart illustrates a method 310B for determining that a predetermined condition exists according to embodiments of the invention, which was first discussed above with reference to FIG. 3, step 310. In this regard, the steps of method 310B may be considered optional sub-steps of step 310. First, as represented by block 450, the node may determine that data to be transmitted is of a high quality of service (QoS) priority class. Next, as represented by block 460, the node may monitor how many previous transmissions have failed and compare the number of failed transmissions to a threshold. For example, the node may determine that ten (10) failed transmissions occurred in a one (1) second time period. If the threshold is set at five (5), then the node will initiate the channel assessment mode.

Next, as represented by block 470, the node may determine that a buffer overflow is critical. Again, the node may monitor the buffer overflow and determine that it has surpassed a threshold. If so, the node may initiate the channel assessment mode.

Next, as represented by block 480, the node may determine that one or more high priority link packets are to be transmitted. Then, the node may initiate the channel assessment mode.

As discussed above, any of steps 450, 460, 470 and/or 480 may be performed individually or in combination with one or more of the other steps in order for the node and/or system to initiate the channel assessment mode in response. Further, any of the triggers indicated in step 410 may be performed in combination with one or more of the other triggers indicated in step 410 and/or in combination with one or more of steps 450, 460, 470 and/or 480 in order for the node and/or system to initiate the channel assessment mode in response.

FIGS. 5A and 5B illustrate methods related to the channel assessment mode and scheme. Once the channel assessment mode has been initiated, the data packet length may be estimated (see FIG. 5A) or determined by look-up (see FIG. 5B) and the transmission may be initiated at the end of the data packet. In some embodiments, a random number may be determined and compared to a probability threshold, and if the determined random number is greater than (or lower than) the probability threshold before initiating transmission. The probability threshold, as used herein, may refer to a single threshold, multiples thresholds forming a range or multiples ranges.

Referring now to FIG. 5A, a flowchart illustrates a method for initiating transmission at an estimated end of a data packet according to embodiments of the invention. As discussed above, data packets transmitted over the air usually carry information indicating the length of the data packet. This is typically defined as the number of payload bytes. This information may be part of the packet header as discussed with reference to FIG. 1 above. The first step, as represented by block 510, is for a node to estimate an end of a data packet being transmitted over the channel. For example, in various embodiments, the node continuously monitors the channel and receives a data packet header. The header, in some cases, includes information indicating the length of the data packet.

Next, as represented by block 520, a node implements a probability threshold, that in some embodiments, includes determining a random number and comparing it to a probability threshold. For example, in some embodiments, the node uses a "p-persistent access" protocol to determine the probability threshold.

Finally, as represented by block 530, if the determined random number is above, below or within the probability threshold, then a node initiates transmission at the estimated end of the data packet.

Referring now to FIG. 5B, a flowchart illustrates a method 500B for initiating transmission at a determined end of a data packet according to embodiments of the invention. The packet length of certain packet types may be predetermined. In such cases, the node and/or system can determine, based on look-up tables, the length of the packet.

The first step, represented by block 550 is for a node to determine a predetermined packet length. Sub-step 550A is for a node to monitor the channel. This monitoring may be done periodically, continuously, randomly or otherwise. The next sub-step 550B is for a node to receive a data packet header including information indicative of a data packet type. The data packet type, if the length has been predetermined, corresponds to a standardized data packet length, that is stored and correlated to the corresponding data packet type in one or more look-up tables stored by the node or another node in communication with the node. Thus, the last sub-step 550C is for a node to retrieve the predetermined packet length corresponding to the data packet type.

Next, as represented by block 560, is for a node to determine an end of a data packet being transmitted over the channel based on the predetermined packet length. Next, as represented by block 570 and in some cases similar to step 520 of FIG. 5A discussed above, is for a node to determine a random number and compare it to a probability threshold. Finally, as represented by block 580, if the determined random number is above, below or within (if a range) the probability threshold, then a node initiates transmission at the estimated end of the data packet.

In various embodiments, for WLAN access points operating according to embodiments of the invention, may be operating with a 100% duty cycle in order to conform to standards. Accordingly, if the access point monitors the channel and performs end of packet estimations or determinations as discussed herein, minimal or no additional power consumption by the access point is necessary.

Unless specified, the invention is not limited to any particular types of devices (either access points, UEs, stations or otherwise). As used herein, a device may also be referred to as a UE, a system, an access point or apparatus. Examples of devices include mobile phones or other mobile computing devices, mobile televisions, laptop computers, smart screens, tablet computers or tablets, portable desktop computers, e-readers, scanners, portable media devices, gaming devices, cameras or other image-capturing devices, headgear, eyewear, watches, bands (e.g., wristbands) or other wearable devices, or other portable computing or non-computing devices.

Each processor described herein generally includes circuitry for implementing audio, visual, and/or logic functions. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory ("RAM") having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

The various features described with respect to any embodiments described herein are applicable to any of the other embodiments described herein. As used herein, the terms data and information may be used interchangeably. Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory ("ROM"), an erasable programmable read-only memory ("EPROM" or Flash memory), a compact disc read-only memory ("CD-ROM"), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable information processing apparatus in order to produce a particular machine, such that the one or more computer-executable program code portions, which execute via the processor of the computer and/or other programmable information processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable information processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable information processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

The invention claimed is:

1. A method for efficient channel access, the method comprising:
   determining, by a device, that a predetermined condition exists on a radio bandwidth, wherein the determining that the predetermined condition exists comprises determining a current channel utilization ratio based on an energy level detected on a channel of the radio bandwidth relative to a first threshold; and
   in response to the device determining that the predetermined condition exists on the channel of the radio bandwidth, initiating, by the device, a channel assessment mode,
      wherein the channel assessment mode implements a randomized channel assessment scheme comprising:
         determining an end of a data packet being transmitted on the channel of the radio bandwidth;
         comparing a randomly generated number to a second threshold; and
         accessing the channel of the radio bandwidth at the end of the data packet based on a predetermined result of the comparing the randomly generated number to the second threshold.

2. The method of claim 1, wherein the determining that the predetermined condition exists comprises:
   monitoring the radio bandwidth for one or more triggering events indicative of interference; and
   detecting at least one of the one or more triggering events indicative of interference on the radio bandwidth.

3. The method of claim 2, wherein:
   the monitoring the radio bandwidth comprises determining a probability of transmission packet collision threshold; and
   the detecting at least one of the one or more triggering events comprises determining that a current or historical probability of transmission packet collision exceeds the probability of transmission packet collision threshold.

4. The method of claim 3, wherein:
   the stationary or mobile device comprises a mobile device; and
   the determining that the current or historical probability of transmission packet collision exceeds the probability of transmission packet collision threshold comprises receiving information by the mobile device from an access point, the received information being indicative of the current or historical probability of transmission packet collision.

5. The method of claim 4, wherein the receiving the information comprises receiving the information in response to requesting, by the mobile device from the access point, information indicative of the current or historical probability of transmission packet collision.

6. The method of claim 2, wherein:
   the monitoring the radio bandwidth comprises monitoring data throughput on the radio bandwidth and determining a data throughput threshold; and
   the detecting the at least one of the one or more triggering events comprises determining that a current or historical data throughput falls below the data throughput threshold.

7. The method of claim 1, wherein the determining that the predetermined condition exists comprises:
   monitoring the radio bandwidth for one or more radio channel measurement criteria.

8. The method of claim 7, further comprising:
   accessing a first radio access system over the radio bandwidth by the stationary or mobile device,
   wherein the monitoring the radio bandwidth for one or more radio channel measurement criteria comprises:
      monitoring the radio bandwidth to identify one or more signals corresponding to a second radio access system different than the first radio access system; and
      determining that the identified one or more signals correspond to the second radio access system different than the first radio access system.

9. The method of claim 7, wherein:
   the monitoring the radio bandwidth for one or more radio channel measurement criteria comprises:
      determining a channel utilization ratio threshold; and
      determining that the current channel utilization ratio exceeds the channel utilization ratio threshold.

10. The method of claim 9, wherein:
the determining the current channel utilization ratio threshold comprises receiving information, from an access point, indicative of the current channel utilization ratio threshold; and
the determining the current channel utilization ratio comprises dividing a quantity of measurement occasions the energy level detected on the radio bandwidth exceeds the current channel utilization ratio threshold by a total number of the measurement occasions.

11. The method of claim 1, wherein the determining that the predetermined condition exists comprises determining a high quality of service (QoS) priority class of the data to be transferred.

12. The method of claim 1, wherein the determining that the predetermined condition exists comprises:
monitoring for previously failed transmissions resulting in a failed retransmissions number; and
determining whether the failed retransmissions number exceeds a predetermined failed retransmission threshold.

13. The method of claim 1, wherein the determining that the predetermined condition exists comprises at least one of:
determining that a buffer overflow is critical; and/or
determining that one or more high priority link packets are to be transmitted.

14. The method of claim 1, wherein:
the determining the end of the data packet being transmitted on the channel of the radio bandwidth comprises estimating the end of the data packet being transmitted on the channel of the radio bandwidth;
the comparing the randomly generated number to the second threshold comprises randomly generating the randomly generated number; and
the accessing the channel comprises initiating a transmission on the channel of the radio bandwidth at the estimated end of the data packet based on a value of the randomly generated number relative to a probability threshold or a probability range.

15. The method of claim 14, further comprising:
monitoring the channel; and
receiving a data packet header comprising information indicative of the end of the data packet,
wherein the estimating the end of the data packet comprises estimating the end of the data packet based at least in part on the information indicative of the data packet end.

16. The method of claim 1, wherein the implementing the randomized channel assessment scheme comprises:
determining a p-persistent access probability threshold range; and
initiating a transmission on the channel at an estimated end of the data packet based on the randomly generated number being within the determined p-persistent access probability threshold range.

17. The method of claim 1, wherein the randomized channel assessment scheme comprises:
determining a predetermined packet length;
based on the predetermined packet length, determining the end of the data packet being transmitted on the channel of the radio bandwidth;
determining the randomly generated number;
determining a probability threshold; and
initiating a transmission on the channel of the bandwidth at the estimated end of the data packet based on the a value of the determined random number relative to the determined probability threshold.

18. The method of claim 17, wherein the determining the predetermined packet length comprises:
monitoring the channel;
receiving a data packet header comprising information indicative of a data packet type corresponding to the data packet being transmitted on the channel; and
retrieving the predetermined packet length corresponding to the data packet type.

19. The method of claim 1, wherein the determining the current channel utilization ratio comprises:
determining a channel utilization of the radio bandwidth by one or more of:
determining an amount of time an energy level detected on the radio bandwidth exceeds the first threshold; and/or
determining a number of measurement occasions that the energy level detected on the channel of the radio bandwidth exceeds the first threshold.

20. The method of claim 1, wherein the determining the current channel utilization ratio comprises:
determining a ratio between: i) a quantity of measurements of an energy level detected on the channel of the radio bandwidth above the first threshold, and ii) a quantity of the measurements of the energy level detected on the radio bandwidth below the first threshold.

21. A communication system for efficient channel access, the system comprising:
an access point (AP); and
a user equipment (UE) configured to operatively couple with the AP over a channel of a radio bandwidth, the UE being configured to:
determine that a predetermined condition exists on the channel of the radio bandwidth, wherein the predetermined condition comprises a current channel utilization ratio comprising a ratio between quantity of measurements of an energy level detected on the radio bandwidth above a first threshold; and
in response to determining that the predetermined condition exists on the radio bandwidth, initiate a channel assessment mode by the UE, wherein the channel assessment mode implements a randomized channel assessment scheme comprising:
determining an end of a data packet being transmitted on the channel of the radio bandwidth;
comparing a randomly generated number to a second threshold; and
accessing the channel of the radio bandwidth at the end of the data packet based on a result of the comparing the randomly generated number to the second threshold.

22. The communication system according to claim 21, wherein:
the UE is configured to determine the channel utilization ratio on the radio bandwidth by one or more of:
determining an amount of time an energy level detected on the radio bandwidth exceeds the first threshold; and/or
determining a number of measurement occasions that the energy level detected on the channel of the radio bandwidth exceeds the first threshold.

23. The communication system according to claim 21, wherein:
the UE is configured to determine the current channel utilization ratio on the radio bandwidth by determining a current channel utilization ratio comprising a ratio between a quantity of measurements of an energy level detected on the radio bandwidth above the first threshold and a quantity of the measurements of the energy level detected on the radio bandwidth below the first threshold.

24. A mobile communication device for efficient channel access, the mobile communication device comprising:

a processor; and a memory operatively coupled with the processor, the memory storing instructions executable by the processor to cause the processor to:

determine that a predetermined condition exists on a channel of a radio bandwidth, wherein the determining that the predetermined condition exists comprises determining a current channel utilization ratio based on an energy level detected on the channel of the radio bandwidth relative to a first threshold; and in response to determining that the predetermined condition exists on the channel of the radio bandwidth, initiate a channel assessment mode by the mobile communication device, wherein the channel assessment mode implements a randomized channel assessment scheme comprising:

determining an end of a data packet being transmitted on the channel of the radio bandwidth;

comparing a random number to a second threshold; and accessing the channel of the radio bandwidth at the end of the data packet based on a result of the comparing the random number to the second threshold.

25. The mobile communication device according to claim 24, wherein:

the memory stores instructions executable by the processor to cause the processor to determine the channel utilization ratio on the radio bandwidth by one or more of:

determining an amount of time an energy level detected on the radio bandwidth exceeds the first threshold; and/or determining a number of measurement occasions that the energy level detected on the radio bandwidth exceeds the first threshold.

26. The mobile communication device according to claim 24, wherein:

the memory stores instructions executable by the processor to cause the processor to determine the channel utilization ratio on the radio bandwidth by determining a current channel utilization ratio comprising a ratio between a quantity of measurements of an energy level detected on the radio bandwidth above a predetermined energy level threshold and a quantity of the measurements of the energy level detected on the radio bandwidth below the predetermined energy level threshold.

* * * * *